(12) United States Patent
Boker et al.

(10) Patent No.: US 9,841,489 B2
(45) Date of Patent: Dec. 12, 2017

(54) MITIGATION OF MULTIPATH DISTORTIONS FOR TDOA-BASED GEOLOCATION

(71) Applicant: ELBIT SYSTEMS BMD AND LAND EW-ELISRA LTD., Holon (IL)

(72) Inventors: Eyal Boker, Rosh Haayin (IL); Avinoam Levy, Ramat Gan (IL); Rami Goldreich, Rosh Haayin (IL)

(73) Assignee: ELBIT SYSTEMS BMD AND LAND EW-ELISRA LTD. (IL)

( * ) Notice: Subject to any disclaimer, the term of this patent is extended or adjusted under 35 U.S.C. 154(b) by 0 days.

(21) Appl. No.: 14/902,249

(22) PCT Filed: Jun. 30, 2014

(86) PCT No.: PCT/IL2014/050584
§ 371 (c)(1),
(2) Date: Dec. 30, 2015

(87) PCT Pub. No.: WO2015/001552
PCT Pub. Date: Jan. 8, 2015

(65) Prior Publication Data
US 2016/0370453 A1    Dec. 22, 2016

(30) Foreign Application Priority Data

Jul. 1, 2013 (IL) .......................................... 227285

(51) Int. Cl.
*G01S 5/02* (2010.01)
*G01S 5/06* (2006.01)

(52) U.S. Cl.
CPC .......... *G01S 5/0215* (2013.01); *G01S 5/0221* (2013.01); *G01S 5/0273* (2013.01); *G01S 5/06* (2013.01)

(58) Field of Classification Search
CPC ................................. G01S 5/0215; G01S 5/06
(Continued)

(56) References Cited

U.S. PATENT DOCUMENTS

| 5,437,055 A | * | 7/1995 | Wheatley, III | ........... | H04B 7/10 455/276.1 |
| 6,108,555 A | * | 8/2000 | Maloney | ................... | G01S 5/12 342/457 |

(Continued)

FOREIGN PATENT DOCUMENTS

| CN | 101839971 A | 9/2010 |
| WO | 2011/160698 A1 | 12/2011 |

OTHER PUBLICATIONS

Wikipedia Article,"Multilateration", Apr. 17, 2013 version.*
(Continued)

*Primary Examiner* — Frank J McGue
(74) *Attorney, Agent, or Firm* — Wood, Phillips, Katz, Clark & Mortimer (57) ABSTRACT

Method and system for radiolocation of RF transmitter in the presence of multipath interference. RF receivers are spatially separated at known locations in a moderate multipath environment in the vicinity of the transmitter. Upon detection of a received active RF signal associated with the transmitter, the receivers are directed to acquire measurements of the detected RF signal. Each receiver obtains a sequence of measurements of the RF signal at different positions along a trajectory that provides multiple measurements at relative phase differences between the direct-path and the multipath reflections of the detected RF signal. The receivers may be repositioned automatically or manually, or prearranged or selectively deployed at fixed positions along the trajectory. TDOA measurements between pairs of receivers are calculated based on the obtained measurements, and are averaged to provide a respective updated TDOA mea- (Continued)

surement value for each receiver pair, which is used to determine the transmitter location.

11 Claims, 5 Drawing Sheets

(58) Field of Classification Search
    USPC .......................................................... 342/465
    See application file for complete search history.

(56) References Cited

U.S. PATENT DOCUMENTS

| | | | | |
|---|---|---|---|---|
| 7,872,583 | B1* | 1/2011 | Yushkov | G01S 5/0205 |
| | | | | 235/375 |
| 8,077,091 | B1* | 12/2011 | Guigne | G01S 3/48 |
| | | | | 342/442 |
| 9,288,623 | B2* | 3/2016 | Markhovsky | H04W 4/023 |
| 2002/0196186 | A1 | 12/2002 | Holt | |
| 2008/0186235 | A1* | 8/2008 | Struckman | G01S 5/0221 |
| | | | | 342/465 |
| 2010/0220011 | A1 | 9/2010 | Heuser | |
| 2011/0074631 | A1 | 3/2011 | Parker | |
| 2012/0032852 | A1 | 2/2012 | Parker | |

OTHER PUBLICATIONS

Office Action in corresponding application No. IL 227,285 dated Mar. 31, 2014.
Office Action in corresponding application No. IL 227,285 dated Dec. 21, 2014.
Notice of Allowance in corresponding application No. IL 227,285 dated Dec. 23, 2015.
International Search Report for correspondence PCT application No. PCT/IL2014/050584.
Supplemental European Search Report for corresponding application No. EP 14 819 980.5 dated Nov. 7, 2016.
XP011193920—Hui Liu et al. "Survey of Wireless Indoor Positioning Techniques and Systems", IEEE Transactions on Systems, Man, and Cybernetics: Part C: Applications and Reviews, IEEE Service Center, Piscataway, NJ, US, vol. 37, No. 6, p. 1067-1080.
XP000694477—Rappaport et al. "Position Location Using Wirelss Communications on Highways of the Future", IEEE Communications Magazine, IEEE Service Center, Piscataway, US vol. 34, No. 10, p. 33-41.

* cited by examiner

MITIGATION OF MULTIPATH DISTORTIONS FOR TDOA-BASED GEOLOCATION

FIELD OF THE DISCLOSED TECHNIQUE

The disclosed technique generally relates to radiolocation in a multipath environment.

BACKGROUND OF THE DISCLOSED TECHNIQUE

Geolocation techniques attempt to provide an accurate determination of the current geographic location of a particular object. A common form is radiolocation, which utilizes the transmission and reception of radio frequency (RF) signals and measurements of the RF signal characteristics. In particular, the location of a transmitting source can be determined using a plurality of receivers that obtain measurements relating to the intensity (signal strength) or the phase (delay) of the transmitted RF signal. One approach uses the received signal strength (RSS) to estimate the distance to the transmitting source, assuming that the transmitted signal strength is known. Alternatively, the transmission distance can be estimated based on the time of arrival (TOA) at the receivers if the transmission time and speed of propagation are known. The angle of arrival (AOA) of the transmitted signal, which can be obtained using a directional antenna, may be combined with the distance estimate to provide the transmitter position. A further approach is known as time difference of arrival (TDOA), which is a form of multilateration that measures the differences between the arrival times at multiple spatially separated receivers situated at known locations. For each pair of receivers where their respective locations and the TDOA between them are provided, the set of possible locations for the transmitter that satisfy the measurements will form a hyperbolic curve. By utilizing additional TDOA measurements for other pairs of receivers, multiple hyperbolas can be constructed, and their intersection provides an indication for the likely location of the transmitter.

The aforementioned calculations are straightforward when assuming free-space propagation, but in real-world conditions the transmitted signal tends to undergo phenomena such as absorption, attenuation, refraction, and reflection, which influence the actual propagation of the signal. In environments with an abundance of obstacles and barriers, as is typical in urban terrain, there is a substantial degree of interference from the intervening surfaces, resulting in multipath distortion where reflected and delayed replicates of the signal arrive at the receiver antenna. The obstructed signal undergoes constructive and destructive interference along multiple paths before reaching the receiver, causing variations in both the amplitude and phase of the signal that affect the accuracy of the location estimate. If the receivers are situated at a substantial height it may be possible to bypass many potential obstructions in the transmission region and substantially avoid multipath propagation. However, certain applications are constrained to using ground receivers and thus suffer significant multipath effects.

For a TDOA radiolocation scheme that assumes free-space propagation, the received signals at a pair of receivers differ by a delay and attenuation according to the following equations:

$$x_1 = \alpha_1 s(t-\tau_1)$$

$$x_2 = \alpha_2 s(t-\tau_2) = \alpha_{12} s(t-\tau_{12});$$

where: $x_1$, $x_2$ are the signals received at the two receivers, $s(t)$ is the signal transmitted from the target, $\alpha_1$, $\alpha_2$ are the attenuations and $\tau_1$, $\tau_2$ are the delays. $\alpha_{12}$ and $\tau_{12}$ represent the relative attenuation and the delay between the two sensors, respectively.

However, if the free-space propagation assumption is not valid, such as with ground-level receiver configurations, the multipath model in which each receiver receives a combination of shifted and attenuated signal reflections can be expressed by the following equations:

$$x_1 = \alpha_1 s(t-\tau_1) + \sum_{i=1}^{L_1} \alpha_1^i s(t-\tau_1^i),$$

$$x_2 = \alpha_2 s(t-\tau_2) - \sum_{i=1}^{L_2} \alpha_2^i s(t-\tau_2^i);$$

where: $\alpha_j^i$, $\tau_j^i$ are the attenuation and delay of the $i^{th}$ reflection at the $j^{th}$ receiver, and $L_j$ is the total number of reflections for that receiver. The nature of the multipath which is characterized by the number of reflections, the reflections power and the reflections delays is dependent on the nature of the environment. Dense urban environments are characterized by a large number of reflections which may be stronger than the direct path signals. Even if the multipath reflection signal is relatively weak (e.g., less than 40 dB), it can still have a significant influence on the accuracy of the final location estimate.

Various approaches for mitigating the effects of multipath propagation on geolocation estimation techniques in general, and for TDOA-based geolocation techniques in particular, are known in the art. Some approaches involve different types of algorithms and computational manipulations that attempt to reduce the introduced biases.

U.S. Pat. No. 5,999,129 to Rose, entitled "Multiplatform ambiguous phase circle and TDOA protection emitter location", is directed to the geolocation of a stationary RF signal emitter from two or more moving observer aircraft. The observers receive signals from the emitter, and the ambiguous phase difference between the signals is measured at corresponding update intervals. The observers perform pulse TOA measurements of the received signals over a predetermined clock interval, from which the TDOA of corresponding same-pulse emitter signals are calculated. A series of circular lines of position (LOP) are estimated for each observer based on the ambiguous phase differences measured and associated integer values. Hyperbolic LOPs are also computed based on the TDOA calculations. The emitter location is determined based on the intersection of the hyperbolic LOPs and the circular LOPs.

U.S. Pat. No. 7,132,981 to Roberts, entitled "Method of locating object using phase differences among multiple frequency beacons transmitted from spaced apart transmitter sites", is directed to a technique for geolocating a mobile object in an environment where other locating systems (e.g. GPS systems) may not be expected to operate successfully. At least three transmitter sites whose geolocations are fixed and known transmit dual frequency beacons that are readily received by a mobile receiver within the environment of interest. A receiver located with the object processes the three sets of received signals by measuring phase differences among respective pairs of beacons. The object receiver processes the phase differences to obtain TDOA or TOA information, from which the location the object can be derived. Residual phase errors and frequency offsets may be calibrated out at the receiver.

U.S. Pat. No. 7,139,583 to Yamasaki et al, entitled "Positioning system and method based on time difference of arrival", is directed to a positioning system that measures the time difference of arrival between a terminal station and a plurality of access points, by accumulating a plurality of reception timings for measurement signals which have passed through different propagation environments, and performing a statistic process with respect to the reception timing samples. In particular, each of the access points repeatedly measures a signal transmitted from the station, while varying parameters such as the time, position, or frequency. For example the measurements are performed while slightly changing the position of an antenna at an access point or the position of a station, or while the changing the frequency channel in use. Delay profiles are created from the measurement signals, and a given timing is determined on each delay profile as a reception timing sample for the signal. The reception timing samples are combined, and one reception timing is determined for each access point as a reference timing. The TDOA between the station and access points is calculated based on the reception timings, from which the station position coordinates are calculated.

U.S. Pat. No. 7,911,385 to Heuser, entitled "RF transmitter geolocation system and related methods", is directed to a system for geolocating an RF transmitter in the presence of multipath interference. The system includes a plurality of RF receivers arranged in spaced relation, and a controller configured to generate a plurality of measurements associated with the RF transmitter. The measurements may be at least one of: frequency difference of arrival measurements, time of arrival measurements, time difference of arrival measurements, frequency of arrival measurements, and angle of arrival measurements. The controller computes a plurality of ambiguity functions based upon the measurements and due to the multipath interference, and projects the ambiguity functions onto a common geo-referenced grid. The controller detects a peak on the common geo-referenced grid indicative of a geolocation of the RF transmitter. The common geo-referenced grid may be generated based upon the position, orientation, and/or the relative movement of the RF receivers.

U.S. Pat. No. 8,049,811 to Gines et al, entitled "Method and system for locating signal emitters using iterative residual weighting", discloses determining the location of a signal emitting device using at least three sensors separated and spaced apart from each other. Estimated location data for the device is determined for each sensor or sensor pair, based on which an estimated location is determined. The estimated location data may be based on the angle of arrival, time of arrival, time difference of arrival or the relative signal powers of the received signals. Residual values for the estimated location data is determined, based on a difference between the estimated device location and the estimated location data for a corresponding sensor or sensor pair. The residual values are converted into corresponding weights for the estimated location data for each sensor or unique sensor pair, which are weighted accordingly. The estimated device location is then updated using the weighted estimated location data.

U.S. Pat. No. 8,077,089 to Parker, entitled "Precision geolocation of moving or fixed transmitters using multiple observers", discloses the geolocation of a moving transmitter using a plurality of fixed receiving devices and a moving receiver device. The fixed receivers obtain wavelength-scaled phase-difference measurements, providing a shape of the transmitter trajectory. The phase difference between the moving receiver and at least one fixed receiver is measured to obtain a phase error residual. An estimated starting point of the transmitter is moved to obtain a best-fit residual.

SUMMARY OF THE DISCLOSED TECHNIQUE

In accordance with one aspect of the disclosed technique, there is thus provided a method for determining a location of a radio frequency (RF) transmitter in the presence of multipath interference. The method includes the procedure of providing a plurality of spatially separated RF receivers at known locations in a moderate multipath environment in the vicinity of the transmitter. The method further includes the procedure of detecting an active RF signal associated with the transmitter received by at least one of the receivers and directing the receivers to acquire measurements of the detected RF signal. The method further includes the procedure of obtaining a sequence of measurements of the RF signal at different positions along a trajectory by each of the receivers, where the trajectory provides a plurality of measurements at relative phase differences between the direct-path and the multipath reflections of the detected RF signal. The method further includes the procedure of calculating time difference of arrival (TDOA) measurements between pairs of the receivers based on the obtained measurements. The method further includes the procedure of averaging the TDOA measurements for each of the pairs of receivers to provide a respective updated TDOA measurement value. The method further includes the procedure of determining a location of the transmitter based on the updated TDOA measurement values. The trajectory may be a circular trajectory. The range of the trajectory may be at least half the wavelength of the detected RF signal. The sequence of measurements may be obtained by repeatedly repositioning the receiver multiple times over a selected trajectory pattern. The sequence of measurements may be obtained by a plurality of receivers arranged or selectively deployed at fixed positions along the trajectory. The sequence of measurements may be obtained by simultaneously repositioning a plurality of sub-receivers associated with the receiver along respective sections of the trajectory. The sequence of measurements may be obtained by simultaneously repositioning a plurality of receivers associated with a plurality of RF transmitters operating in different spectral ranges.

In accordance with another aspect of the disclosed technique, there is thus provided a system for determining a location of an RF transmitter in the presence of multipath interference. The system includes a plurality of RF receivers, and a processor. The receivers are spatially separated at known locations in a moderate multipath environment in the vicinity of the transmitter. The processor detects an active RF signal associated with the transmitter received by at least one of the receivers, and directs the receivers to acquire measurements of the detected RF signal. The processor further calculates TDOA measurements between pairs of the receivers based on a sequence of measurements of the RF signal obtained by each of the receivers at different positions along a trajectory, where the trajectory provides a plurality of measurements at relative phase differences between the direct-path and the multipath reflections of the detected RF signal. The processor further averages the TDOA measurements for each of pair of receivers to provide a respective updated TDOA measurement value. The processor further determines a location of the transmitter based on the updated TDOA measurement values. The trajectory may be a circular trajectory. The range of the trajectory may be at least half the wavelength of the detected RF signal. The system may further include repositioning means, for moving at least one of the receivers to different positions along a trajectory. The repositioning means may repeatedly reposition the receiver multiple times over a selected trajectory pattern. The receivers may by arranged or selectively deployed at fixed positions along the trajectory. The repositioning means may simultaneously reposition a plurality of sub-receivers associated with the receiver along respective sections of the trajectory. The repositioning means may simultaneously reposition a plurality of receivers associated with a plurality of RF transmitters operating in different spectral ranges. The repositioning means may include: a shifting mechanism, an automatic mechanical device, a rotating device, a mobile platform, a vehicle, a trolley, and/or at least one person. The receivers may include: a telecommunications receiver, a cellular network receiver, a spectrum management receiver, and/or a broadcast receiver.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a system and method for determining the location of a stationary transmitter with high accuracy via a TDOA-based radiolocation technique by mitigating the distortions resulting from multipath signal propagation. The disclosed technique involves repositioning the receivers in a controlled pattern while receiving the transmitted signal, such as by moving the receivers along a circular trajectory, and collecting a series of different readings at different positions along the trajectory. The subsequent TDOA measurements for the receiver pairs are then averaged, substantially cancelling out the multipath distortions in the signal readings, which tend to be distributed substantially uniformly for varying receiver positions. The transmitter location is then calculated based on the averaged TDOA measurements.

The term "location", and any variations thereof, as used herein refers to any parameter relating to the global or relative position of a particular object with respect to any relevant reference coordinate system (e.g., latitude and longitude coordinates).

Figure 1:
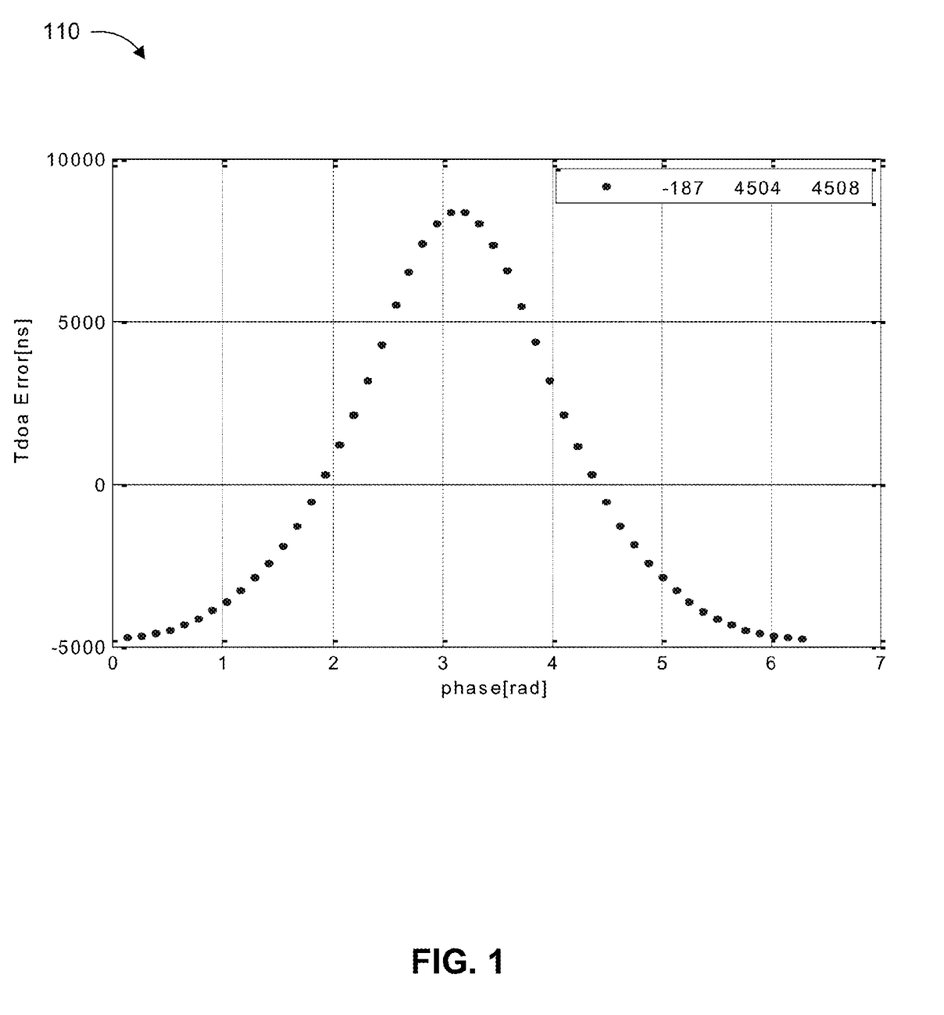
FIG. 1 is a graph illustrating the effect of multipath propagation on TDOA measurements, by means of a simulation.

Reference is now made to FIG. 1, which is a graph, generally referenced 110, illustrating the effect of multipath propagation on TDOA measurements, by means of a simulation. The simulation modelled two FM modulated signals at a bandwidth of 25 kHz for a pair of receivers located at identical ranges from the transmitter, hence the expected TDOA value is 0. To simulate the multipath effect, an additional shifted and attenuated signal replica (representing a single reflection) was added to the first receiver. The reflection was delayed by 20 µs and attenuated by −10 dB with respect to the direct-path signal. The reflection was also multiplied by different phases ranging between 0-2π. Graph 110 depicts the TDOA measurement error (ns) as a function of the reflection phase (radians) for the receiver pair. The text box in graph 110 presents (from left to right): the average TDOA error, the TDOA error standard deviation, and the TDOA root-mean-square error (RMSE). Note that the term "TDOA error" refers to the deviation of a certain measurement value from the expected value, while the term "TDOA bias" refers to the deviation of the final averaged value (the average of all the measurements) from the expected value, also equivalent to the residual error after averaging.

As can be seen in graph 110, the multipath effect is strongly dependent on the reflection phase, and introduces a maximum TDOA error of approximately 8 µs (peak value), which corresponds to a position error greater than 2 km for the resultant transmitter position estimate. The TDOA error as a function of the reflection phase is distributed non-uniformly about the expected value. The average value is still biased relative to the expected value by 187 ns (corresponding to the TDOA bias value), but is closer to the expected value than most of the individual measurement values taken independently.

Figure 2:
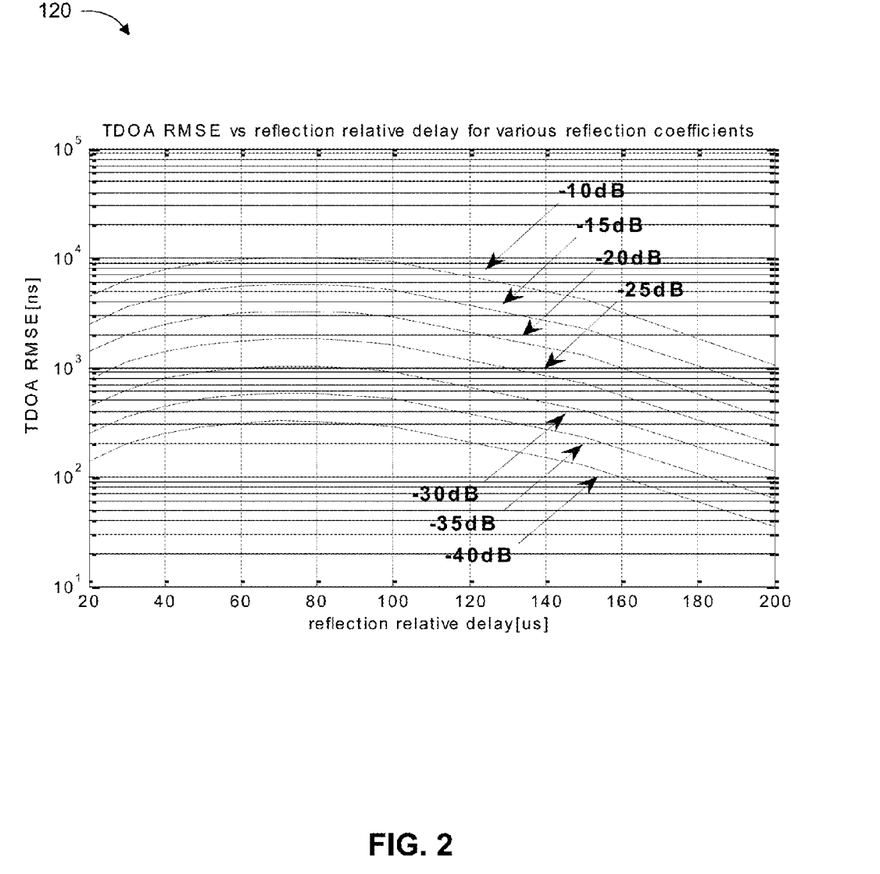
FIG. 2 is a graph illustrating the TDOA measurement bias dependence upon the delay and attenuation of a multipath reflection, by means of a simulation.

Reference is now made to FIG. 2, which is a graph, generally referenced 120, illustrating the TDOA measurement bias dependence upon the delay and attenuation of a multipath reflection, by means of a simulation. Graph 120 shows the TDOA root-mean-squared error (RMSE) introduced by one reflection in one receiver as a function of the reflection delay for various reflection coefficients. The reflection coefficient represents the power loss (attenuation) of the reflection relative to the direct-path signal. The reflection power relative to the direct-path power is a function of the relative path length and the reflection coefficient. As can be seen in graph 120, the TDOA RMSE increases with the reflection delay at lower delay ranges, but decreases with the reflection delay at higher delay ranges. It is also apparent that the TDOA RMSE is higher when the reflection power is stronger (i.e., lower reflection coefficients) and the reflection delay is small. Hence, reflections resulting from very close or very far reflections have only a minor effect on the TDOA estimation errors.

Figure 3:
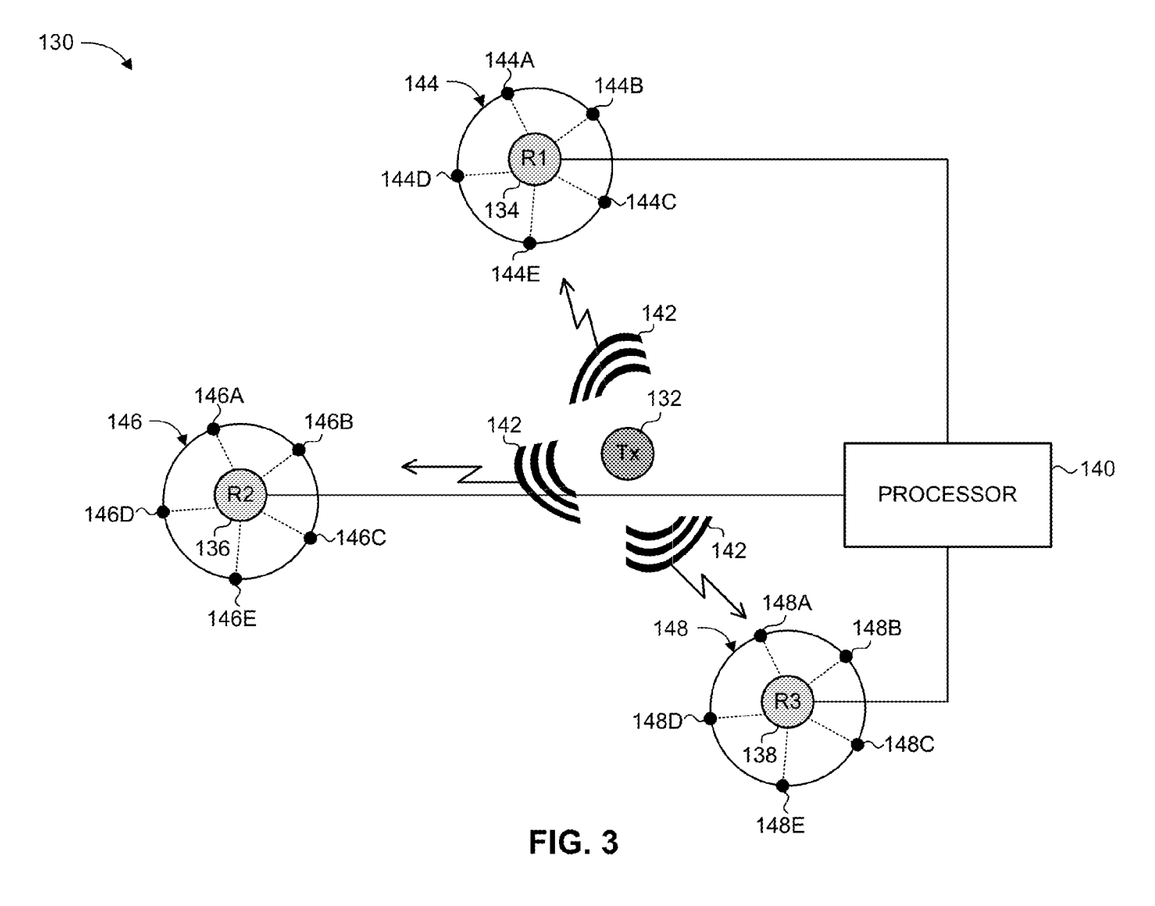
FIG. 3 is a schematic illustration of a system for determining a location of a radio frequency (RF) transmitter in the presence of multipath interference, constructed and operative in accordance with an embodiment of the disclosed technique.

Reference is now made to FIG. 3, which is a schematic illustration of a system, generally referenced 130, for determining the location of an RF transmitter in the presence of multipath interference, constructed and operative in accordance with an embodiment of the disclosed technique. System 130 includes a radio frequency (RF) transmitter 132, a plurality of RF receivers 134, 136, 138, and a processor 140. Processor 140 is coupled with receivers 134, 136, 138. Receivers 134, 136, 138 are situated at separate locations but are each disposed within sufficient range to receive an RF signal transmission from transmitter 132.

Transmitter 132 may include standard components and/or circuitry associated with the transmission of a radio frequency signal, such as a signal generator, a modulator, an antenna, a power supply, and the like. Similarly, each of receivers 134, 136, 138 may include standard components and/or circuitry associated with the reception of a radio frequency signal, such as filters, amplifiers, an antenna, a power supply, and the like. The disclosed technique is generally applicable to RF communication signals propagating through a moderate multipath environment in which there are relatively few multipath reflections and which entails line-of-sight propagation between the transmitter and the receivers (i.e., such that the direct-path signal is at least stronger than the multipath reflections). The disclosed technique is applicable to RF signals having a bandwidth for which TDOA-based calculations would be feasible and would provide reasonably accurate results, such as bandwidths on the order of tens of kHz (higher bandwidths would generally require using TOA calculations). The RF signal may be any frequency within the RF spectral range (e.g., VHF, UHF), and may be modulated.

According to an embodiment of the disclosed technique, transmitter 132 and receivers 134, 136, 138 are disposed at or near ground level, where multipath distortions may be particularly likely to occur. Nevertheless, the transmitter and receivers may alternatively be high above ground level, provided that they are in any environment subject to moderate multipath interference with line-of-sight propagation.

Transmitter 132 is situated at an unknown location and is substantially stationary, such that it does not shift its position (beyond a marginal amount) throughout the duration of the location determination process. Receivers 134, 136, 138 are situated at separate known locations, and are movable to various positions for receiving a transmitted RF signal at a plurality of spatially separate locations, as will be elaborated upon further below.

Processor 140 provides synchronization between receivers 134, 136, 138, to enable the subsequent analysis of the time difference of arrival data. Processor 140 may also control the activation and operation of receivers 134, 136, 138, and performs signal processing. It is noted that any of the functionality of processor 140 may be implemented via a plurality of processors and/or may be partially or fully distributed among any of the other components of system 130. For example, at least one of receivers 134, 136, 138 may be integrated with a dedicated microprocessor, which may perform at least a portion of the signal processing associated with the respective component.

To initiate the geolocation process, processor 140 instructs receivers 134, 136, 138 to collect data in a selected spectral range. Processor 140 analyzes the received data to detect active RF signals that may be associated with transmitter 132. When a suitable active RF signal is detected as having been received by at least one receiver, processor 140 instructs each of receivers 134, 136, 138 to acquire measurements of the detected signal. The detected signal is equivalent to the RF signal 142 transmitted by transmitter 132 convolved with the transmission function between transmitter 132 and the respective receiver 134, 136, 138 (the transmission function which may include direct-path and/or reflections of the RF signal 142). Each of receivers 134, 136, 138 performs repeated measurements of RF signal 142 while shifting positions. In particular, the receiver follows a predetermined path while acquiring a series of measurements of RF signal 142 at different points along the path. For example, receiver 134 at location R1 is moved along trajectory 144, and acquires measurements at each of trajectory points 144A, 144B, 144C, 144D and 144E. Similarly, receiver 136 at location R2 is moved along trajectory 146, and acquires measurements at each of trajectory points 146A, 146B, 146C, 146D and 146E. As well, receiver 138 at location R3 is moved along trajectory 148 and acquires measurements at each of trajectory points 148A, 148B, 148C, 148D and 148E. It is noted that five trajectory points are depicted for exemplary purposes only, but in general a large number of measurements should be obtained along the trajectory. The range of the movement pattern traversed by the receiver is determined as a function of the wavelength of the measurement signal 142, to ensure that measurements are obtained at various phase differences distributed between the entire range of $0$-$2\pi$. For example, the radius of trajectories 144, 146, 148 should be at least half the wavelength of RF signal 142 (or correspondingly, the minimum diameter is equal to the signal wavelength). The movement pattern is along the plane at which the RF signals (direct-path and reflections) propagate from transmitter 132, to ensure that relative phase differences are generated between the direct path and reflections. It is noted that trajectories 144, 146 and 148 are depicted as substantially circular, which provides a uniform span of reflection delays regardless of the constellation of the transmitter and receiver. Other trajectory shapes or patterns may be less beneficial, but may be applied provided that a diversity of phase differences between the direct-path and reflection signals are obtained.

The receiver movement may be implemented using any suitable mechanism or technique for shifting the position at which the signal reception is performed by the respective receiver. For example, the receiver may be repositioned using an automatic mechanical device, such as a rotating device that moves the receiver along a circular trajectory. For another example, a receiver may be coupled with a mobile platform, such as being mounted onto a vehicle or onto a robotic trolley, which can be maneuvered along a particular path to transport the coupled receiver to different positions along the path. Alternatively, a receiver may be held or carried by a person, who can manually transport the receiver to different positions. The rate at which the receiver is moved along its trajectory should be at least rapid enough to obtain sufficient coverage of relative phase differences between the direct-path and reflection signals. The receiver movement may involve repeatedly following the same trajectory over multiple cycles, for example by shifting the receiver multiple times around a circular pattern (such as circular trajectories 144, 146 and 148). Repeatedly following the same trajectory path in a cyclic manner ensures that a sufficient number of measurements representing phase differences distributed between the entire range of $0$-$2\pi$ are attained. For example, a rotating mechanism may be configured to repeatedly reposition the receiver along a circular trajectory at a rate of 60 rpm (i.e., corresponding to one full rotation each second).

The measurement data at includes at least the time difference of arrival (TDOA) of RF signal 142 between pairs of receivers 134, 136, 138 at each of the trajectory positions. Accordingly, processor 140 calculates a series of TDOA measurements between receivers 134 and 136, between receivers 134 and 138, and between receivers 136 and 138, for each of the different positions of the receivers in the respective pairing. Subsequently, processor 140 calculates an average value of all the TDOA measurements for each receiver pair. Processor 140 then calculates the location of transmitter 132 based on the average TDOA values. In general, system 130 may include more than three receivers and localization can be performed based on TDOA data obtained for only three of the receiver pairings, for all possible receiver pairings, or for any number in between (the position estimation is more accurate as the number of receivers is increased). Three receivers is the minimum number required to allow for localization, although it is possible to achieve the effect of a certain number of receivers using a smaller number of actual receivers (e.g., using two receivers, at least one of which is shifted to a substantially different location over the course of the localization, to effectively represent the position of a "third receiver").

The change in positions of the receivers introduces diversity in the relative phase between the direct-path and reflections of the reception signal. As a result, the estimated TDOA errors associated with the relative phase differences (the errors arising primarily from multipath propagation and other distortions in the reception signal) tends to be distributed around the true value. Therefore, averaging the total sequence of values for each of the varying receiver positions will provide a final value that tends to approach the true value. In this manner, averaging the values at different reception positions serves to substantially reduce the bias associated with the multipath effect in the signal. This phenomenon is evident from graph 110 (FIG. 1), as discussed hereinabove.

While in theory, if it is known in advance which receivers are influenced by multipath interference, then can reposition only the relevant receivers (rather than all of them) in order to obtain an improved location estimate. In practice, however, such information is not available, and so the general approach is to reposition all of the receivers.

According to another embodiment of the disclosed technique, a plurality of receivers (or receiving antennas) are prearranged at different fixed positions along the trajectory, or alternatively, may be selectively deployed to fixed positions along the trajectory, e.g., by activating a switch that deploys all the receivers. In this manner, the need for physically moving or repositioning the receiver is obviated.

According to a further embodiment of the disclosed technique, the sequence of measurements obtained at different positions along a trajectory by a receiver may be obtained in practice using multiple receivers (or receiving antennas), which are simultaneously repositioned along respective sections of the entire trajectory. For example, referring to FIG. 3, the measurements of receiver 134 along trajectory 144 may be obtained using a pair of "sub-receivers" 134A and 134B, where a first sub-receiver 134A is successively repositioned around one half of the circumference of circular trajectory 144 (e.g., passing through at least trajectory points 144A, 144B and 144C), while concurrently, the second sub-receiver 134B is successively repositioned around the other half of the circumference of circular trajectory 144 (e.g., passing through at least trajectory points 144D, 144E and 144A). This pattern may be repeated multiple times (i.e., in a cyclic matter), as necessary. Correspondingly, four sub-receivers associated with receiver 134 may be concurrently repositioned simultaneously along respective quadrants of circular trajectory 144. In this manner, the repositioning mechanism may achieve a greater number of total measurements for a given duration. For example, a rotating device would obtain twice the number of measurements in the same period of time using two sub-receivers moving concurrently over half sectors of a circular trajectory, as compared to one receiver moving along the entire trajectory at the same rate. For example, a rotating device operating at 60 rpm with two sub-receivers (such that each sub-receiver completes a full rotation each second), would obtain twice the total number of measurements per second than when using a single receiver.

According to yet another embodiment of the disclosed technique, a single repositioning mechanism (e.g., rotating device) may be configured to reposition multiple receivers operative to detect different transmitters operating in different spectral domains. For example, referring to FIG. 3, a first set of RF receivers 134A, 136A, 138A are directed to determine the geolocation of a first RF transmitter 132A operative in a first RF spectral range domain (e.g., in the VHF range), while a second set of RF receivers 134B, 136B, 138B are directed to determine the geolocation of a second RF transmitter 132B operative in a second RF spectral range domain (e.g., in the UHF range), where both sets of transmitters/receivers are in the same vicinity. Accordingly, a rotating device (not shown) may be configured to rotate at least one receiver belonging to each set, together or separately, along the same or different circular trajectories. For example, the rotating device may rotate both receivers 134A and 134B along circular trajectory 144, such that receiver 134A obtains a sequence of RF measurements respective of transmitter 132A along different points of trajectory 144, while receiver 134B obtains a sequence of RF measurements respective of transmitter 132B along different points of trajectory 144.

Figure 4:
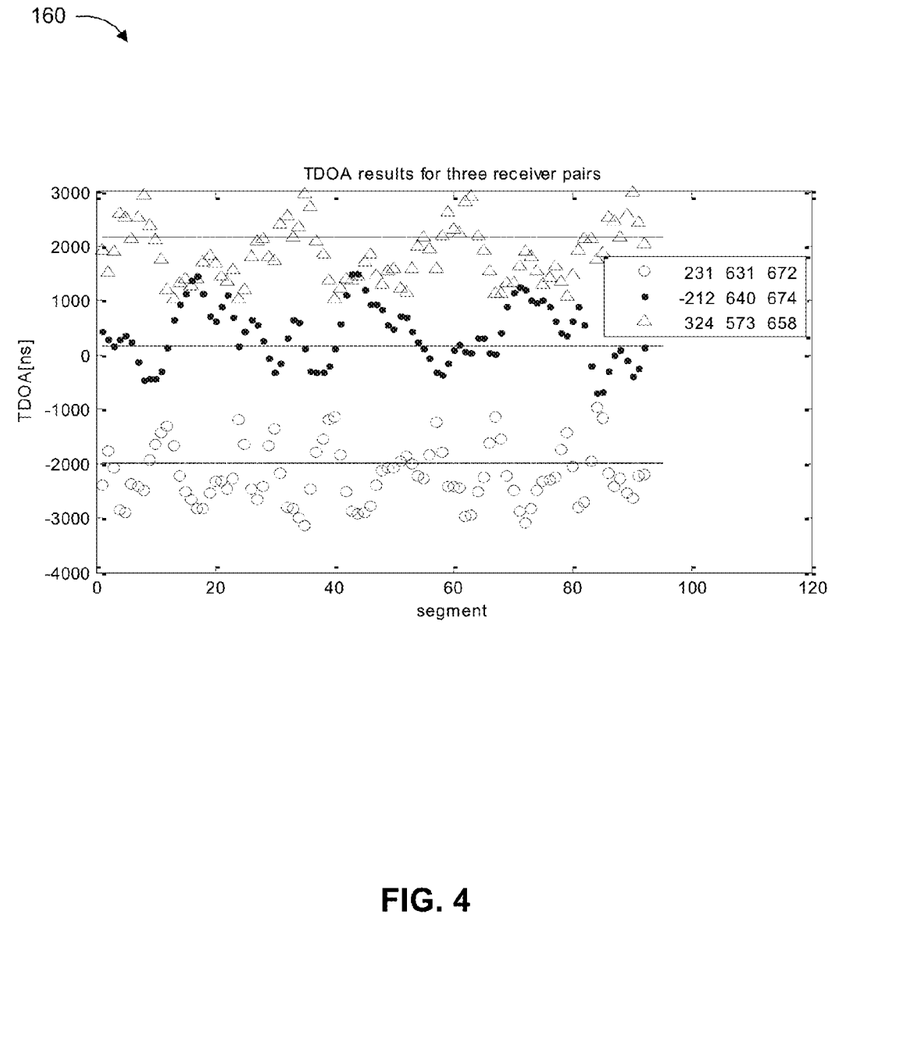
FIG. 4 is a graph illustrating the level of TDOA bias when the receivers are repositioned while acquiring measurements in accordance with the disclosed technique, based on the results of an experiment.

Reference is now made to FIG. 4, which is a graph, generally referenced 160, illustrating the level of TDOA bias when the receivers are repositioned while acquiring measurements in accordance with the disclosed technique, based on the results of an experiment. The experiment for graph 160 was performed using three receivers situated at the vertices of an approximately equilateral triangle with side lengths of ~5 km, and a transmitting RF signal with a 25 kHz bandwidth at a frequency of 79 MHz located inside the triangle. Each of the receivers was repositioned along the perimeter of a 3 m radius circular trajectory. TDOA measurements were obtained for segments of 400 ms every 200 ms. A segment represents a time instant in which the receivers are considered to be substantially stationary (it is assumed that the receiver does not move much over 400 ms). Hence, each segment represents a certain realization of the receiver position (which corresponds to a certain realization of relative phase).

Graph 160 depicts the TDOA measurement (in units of ns) as a function of the segment for the three receiver pairings. The estimated TDOA readings are represented by the triangular, circular, and dotted symbols, respectively, and the corresponding expected TDOA values are represented by the dashed lines. The text box in graph 160 provides statistical properties of the TDOA error for the TDOA measurements associated with each combination of receiver pairs, where the first (leftmost) column indicates the average TDOA error, the second column indicates the standard deviation of the TDOA error, and the third column indicates the TDOA RMSE.

Graph 160 demonstrates that the multipath effect is dominant for all of the receivers, as expressed by the high TDOA RMSE values of ~600 ns and maximum TDOA bias above 1 µs. This level of TDOA bias may result in a localization error (i.e., the error in the resultant transmitter position estimate using the associated TDOA values) of above 500 m. The segments in which the TDOA error is significant correspond to receiver positions realizing phase differences that result in a high TDOA bias. Hence, it may be concluded that for stationary receivers there is a high probability for a large TDOA bias. It can also be seen from graph 160 that the TDOA measurements for each of the receiver pairs are distributed around the expected value. By averaging the TDOA measurements, the TDOA bias for the corresponding receiver pairs was reduced from approximately 1 µs (worst case) to approximately 250 ns. The resulting localization error is reduced from approximately 500 m to approximately 38 m.

Figure 5:
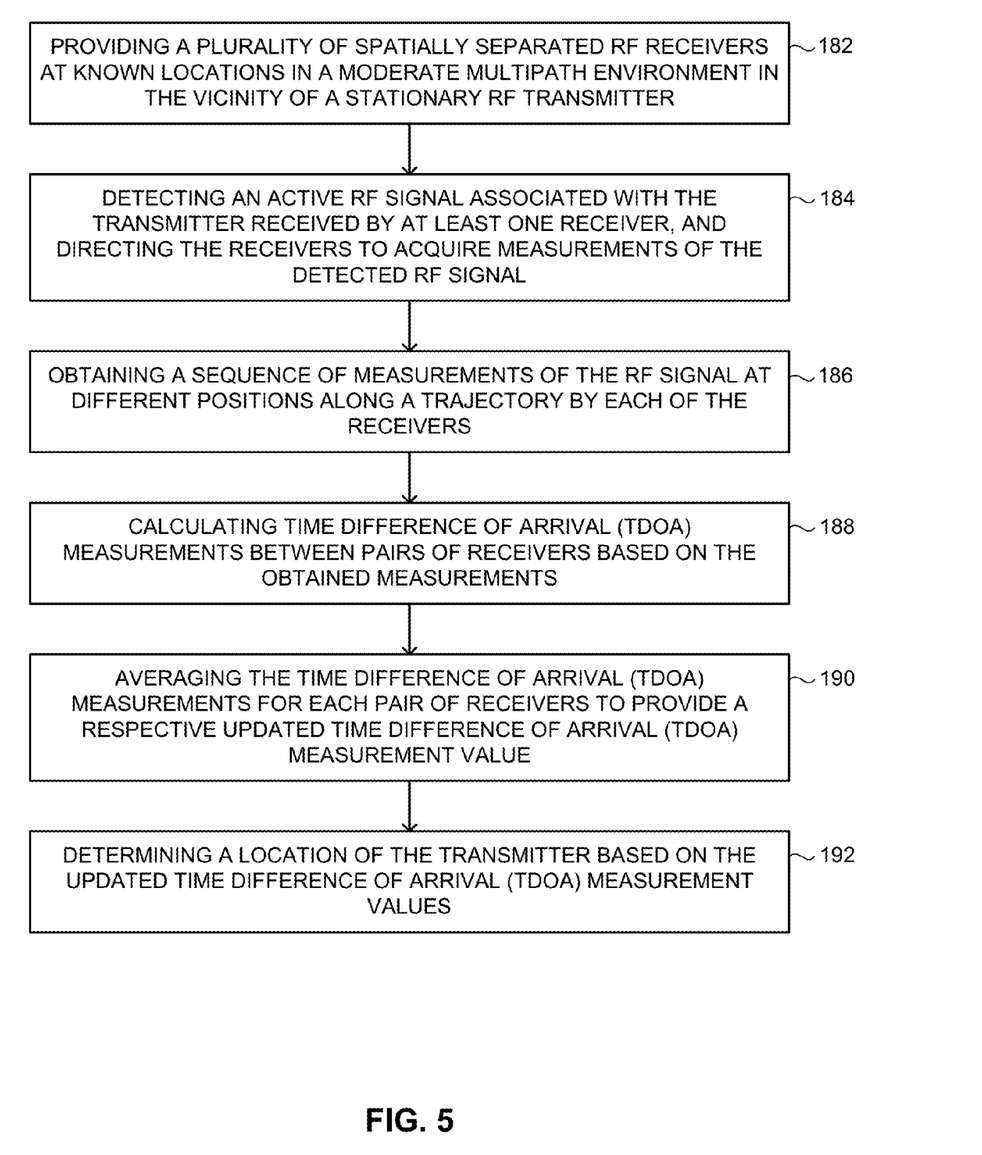
FIG. 5 is a block diagram of a method for determining a location of a RF transmitter in the presence of multipath interference, operative in accordance with an embodiment of the disclosed technique.

Reference is now made to FIG. 5, which is a block diagram of a method for determining a location of an RF transmitter in the presence of multipath interference, operative in accordance with an embodiment of the disclosed technique. In procedure 182, a plurality of spatially separated RF receivers are provided at known locations in a moderate multipath environment in the vicinity of a stationary RF transmitter. Referring to FIG. 3, receivers 134, 136 and 138 are disposed at separate respective locations R1, R2 and R3, and are all within reception range of transmitter 132. The environment is subject to multipath reflections and there is line-of-sight propagation between transmitter 132 and receivers 134, 136, 138

In procedure 184, an active RF signal associated with the transmitter received by at least one receiver is detected, and the receivers are directed to acquire measurements of the detected RF signal. Referring to FIG. 3, processor 140 instructs receivers 134, 136, 138 to collect data in a selected spectral range, and analyzes the received data to detect active RF signals that may be associated with transmitter 132. When a suitable active RF signal is detected as having been received by at least one receiver, processor 140 instructs each of receivers 134, 136, 138 to acquire measurements of the detected signal, which may include the direct-path and/or reflections of an RF signal 142 being transmitted by transmitter 132.

In procedure 186, a sequence of measurements of the RF signal is obtained at different positions along a trajectory be each of the receivers. Referring to FIG. 3, each of receivers 134, 136 and 138 are moved to various positions along a trajectory while obtaining readings of RF signal 142. For example, receiver 134 is sequentially shifted to positions 144A, 144B, 144C, 144D and 144E along circular trajectory 144, and obtains a respective reading at each position. Similarly, receiver 136 is sequentially shifted to various positions along trajectory 146, while receiver 138 is sequentially shifted to various positions along trajectory 148. Alternatively, the sequence of measurements may be obtained by multiple receivers (or receiving antennas) that are arranged at fixed positions along the trajectory, or that are selectively deployed to fixed positions along the trajectory.

In procedure 188, TDOA measurements between pairs of receivers are calculated based on the obtained measurements. Referring to FIG. 3, processor 140 calculates TDOA measurements for different pairs of receivers 134, 136, 138, based on the obtained series of readings at different positions at each receiver. In particular, TDOA measurements are obtained between receivers 134 and 136, between receivers 134 and 138, and between receivers 136 and 138, for each of the different positions of the receivers in the respective pairing.

In procedure 190, the TDOA measurements for each pair of receivers are averaged, to provide a respective updated TDOA measurement value for that receiver pair. Referring to FIG. 3, processor 140 calculates an average value of all the TDOA measurements for each receiver pair. For example, processor 140 averages all the TDOA measurements between receivers 134 and 136 to obtain a final averaged TDOA value between receivers 134 and 136. Similarly, processor 140 obtains an averaged TDOA value between receivers 134 and 138, and between receivers 136 and 138.

In procedure 192, a location of the transmitter is determined based on the updated TDOA measurement values. Referring to FIG. 3, processor 140 calculates the location of transmitter 132 based on the average TDOA values calculated for each receiver pair. In particular, processor 140 uses the updated TDOA between each pair among receivers 134, 136, 138, to obtain a position estimate of transmitter 132.

The disclosed technique is applicable to geolocation for any purpose, and can be employed in a wide variety of applications, including both civilian and military applications. For example, the disclosed technique may be utilized in communications infrastructures, such as to locate potential pirate transmissions that are interfering with sanctioned broadcasts and other forms of spectrum management. Another example is in conjunction with cellular networks, such as to provide accurate assessment of a mobile device, e.g., in addition to or instead of standard global positioning systems (GPS). Alternatively, a plurality of cellular antennas may be configured to rotate along different planar trajectories in order to obtain receptions of a transmitted signal for which the direction of arrival is not known in advance. A further potential application of the disclosed technique is for localization of missing or stolen vehicles.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A method for determining a location of a radio frequency (RF) transmitter in the presence of multipath interference, the method comprising the procedures of:
    providing a plurality of spatially separated RF receivers at known locations in a multipath environment in the vicinity of said transmitter;
    detecting an active RF signal associated with said transmitter received by at least one of said receivers, and directing said receivers to acquire measurements of the detected RF signal;
    repeatedly repositioning the receivers along a circular trajectory at a sufficiently rapid rate to obtain a sequence of measurements of the RF signal by each of the receivers at different positions along the circular trajectory at a diversity of relative phase differences between the direct-path and the multipath reflections of the RF signal;
    calculating time difference of arrival (TDOA) measurements between pairs of said receivers based on the obtained measurements;
    averaging the TDOA measurements for each of said pairs of receivers to provide a respective updated TDOA measurement value, without requiring a direct determination of the multipath component of the RF signal; and
    determining a location of said transmitter based on the updated TDOA measurement values.

2. The method of claim 1, wherein the range of said circular trajectory is at least half the wavelength of said detected RF signal.

3. The method of claim 1, wherein said procedure of repeatedly repositioning the receivers along a circular trajectory comprises simultaneously repositioning a plurality of sub-receivers associated with the receiver along respective sections of said circular trajectory.

4. The method of claim 1, wherein said procedure of repeatedly repositioning the receivers along a circular trajectory comprises simultaneously repositioning a plurality of receivers associated with a plurality of RF transmitters operating in different spectral ranges.

5. A system for determining a location of a radio frequency (RF) transmitter in the presence of multipath interference, the system comprising:
   a plurality of RF receivers, spatially separated at known locations in a multipath environment in the vicinity of said transmitter; and
   a processor, coupled with said receivers, said processor operative for detecting an active RF signal associated with said transmitter received by at least one of said receivers and directing said receivers to acquire measurements of the detected RF signal, said processor further operative to calculate time difference of arrival (TDOA) measurements between pairs of said receivers based on a sequence of measurements of the RF signal obtained by each of the receivers at different positions along a circular trajectory by repeatedly repositioning the receivers along the circular trajectory at a sufficiently rapid rate to obtain the measurements at a diversity of relative phase differences between the direct-path and the multipath reflections of the RF signal, said processor further operative to average the TDOA measurements for each of said pairs of receivers to provide a respective updated TDOA measurement value, without requiring a direct determination of the multipath component of the RF signal, and further operative to determine a location of said transmitter based on the updated TDOA measurement values.

6. The system of claim 5, wherein the range of said circular trajectory is at least half the wavelength of said detected RF signal.

7. The system of claim 5, further comprising repositioning means, operative to repeatedly reposition at least one of said receivers to different positions along the circular trajectory.

8. The system of claim 7, wherein said repositioning means is operative to simultaneously reposition a plurality of sub-receivers associated with said receiver along respective sections of said circular trajectory.

9. The system of claim 7, wherein said repositioning means is operative to simultaneously reposition a plurality of receivers associated with a plurality of RF transmitters operating in different spectral ranges.

10. The system of claim 7, wherein said repositioning means is selected from the list consisting of:
    a shifting mechanism;
    an automatic mechanical device;
    a rotating device;
    a mobile platform;
    a vehicle;
    a trolley; and
    at least one person.

11. The system of claim 5, wherein said receivers are selected from the list consisting of:
    a telecommunications receiver;
    a cellular network receiver;
    a spectrum management receiver; and
    a broadcast receiver.

* * * * *